(12) United States Patent
Umetsu et al.

(10) Patent No.: US 8,035,347 B2
(45) Date of Patent: Oct. 11, 2011

(54) BATTERY CHARGER

(75) Inventors: Koji Umetsu, Miyagi (JP); Masanao Sato, Fukushima (JP); Kazumi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 12/175,269

(22) Filed: Jul. 17, 2008

(65) Prior Publication Data

US 2009/0027012 A1    Jan. 29, 2009

(30) Foreign Application Priority Data

Jul. 25, 2007   (JP) .................................. 2007-193327

(51) Int. Cl.
*H02J 7/04* (2006.01)
*H02J 7/06* (2006.01)

(52) U.S. Cl. ...................... 320/148; 320/162; 320/164

(58) Field of Classification Search .................. 320/148, 320/162, 164
See application file for complete search history.

(56) References Cited

U.S. PATENT DOCUMENTS

| | | | |
|---|---|---|---|
| 5,408,170 A | | 4/1995 | Umetsu et al. |
| 5,811,895 A | * | 9/1998 | Suzuki et al. .................. 307/125 |
| 5,994,875 A | * | 11/1999 | Lee ................................ 320/132 |
| 6,104,165 A | * | 8/2000 | Miyamoto et al. ............ 320/125 |
| 6,526,293 B1 | * | 2/2003 | Matsuo .......................... 455/573 |
| 2005/0194935 A1 | * | 9/2005 | Kubota et al. ................. 320/128 |

FOREIGN PATENT DOCUMENTS

| | | |
|---|---|---|
| JP | 06-014473 | 1/1994 |
| JP | 6-014473 | 1/1994 |
| JP | 06-098472 | 4/1994 |
| JP | 2006-121797 | 5/2006 |
| JP | 2007-020299 | 1/2007 |

OTHER PUBLICATIONS

Japanese Office Action issued on Jul. 14, 2009, for corresponding Japanese Patent Application JP 2007-193327.

* cited by examiner

*Primary Examiner* — M'Baye Diao
(74) *Attorney, Agent, or Firm* — K&L Gates LLP (57) ABSTRACT

A battery charger for charging a secondary battery using a power supply circuit, includes a discrimination circuit to discriminate a constant-current charging mode and a constant-voltage charging mode, and a controller to which a discrimination signal is supplied. When judged as being the constant-current charging mode, the controller sets the current in the constant-current charging mode by using the control signal. When judged as being the constant-voltage charging mode in accordance with the discrimination signal, the controller sets intermittently the end of charging detection current, and sets an end of charging detection period for judging the constant-current charging mode and the constant-voltage charging mode. When the discrimination signal indicates the constant-voltage charging mode in the end of charging detection period, the controller controls to shift to the end of charging detection mode.

4 Claims, 10 Drawing Sheets

FIG.11

BATTERY CHARGER

CROSS-REFERENCE TO RELATED APPLICATIONS

The present application claims priority to Japanese patent Application No. 2007-193327 filed in the Japanese Patent Office on Jul. 25, 2007, the entire disclosure of which is incorporated herein by reference.

BACKGROUND

The present application relates to a battery charger for a charging battery pack of secondary batteries.

Battery chargers for charging secondary batteries using commercial power sources have been known. The present inventors have already proposed a battery charger described in Japanese Patent No. 3430264 (Japanese Unexamined Patent Application Publication (KOKAI) No. H6-14473: Patent Document 1).

Figure 1:
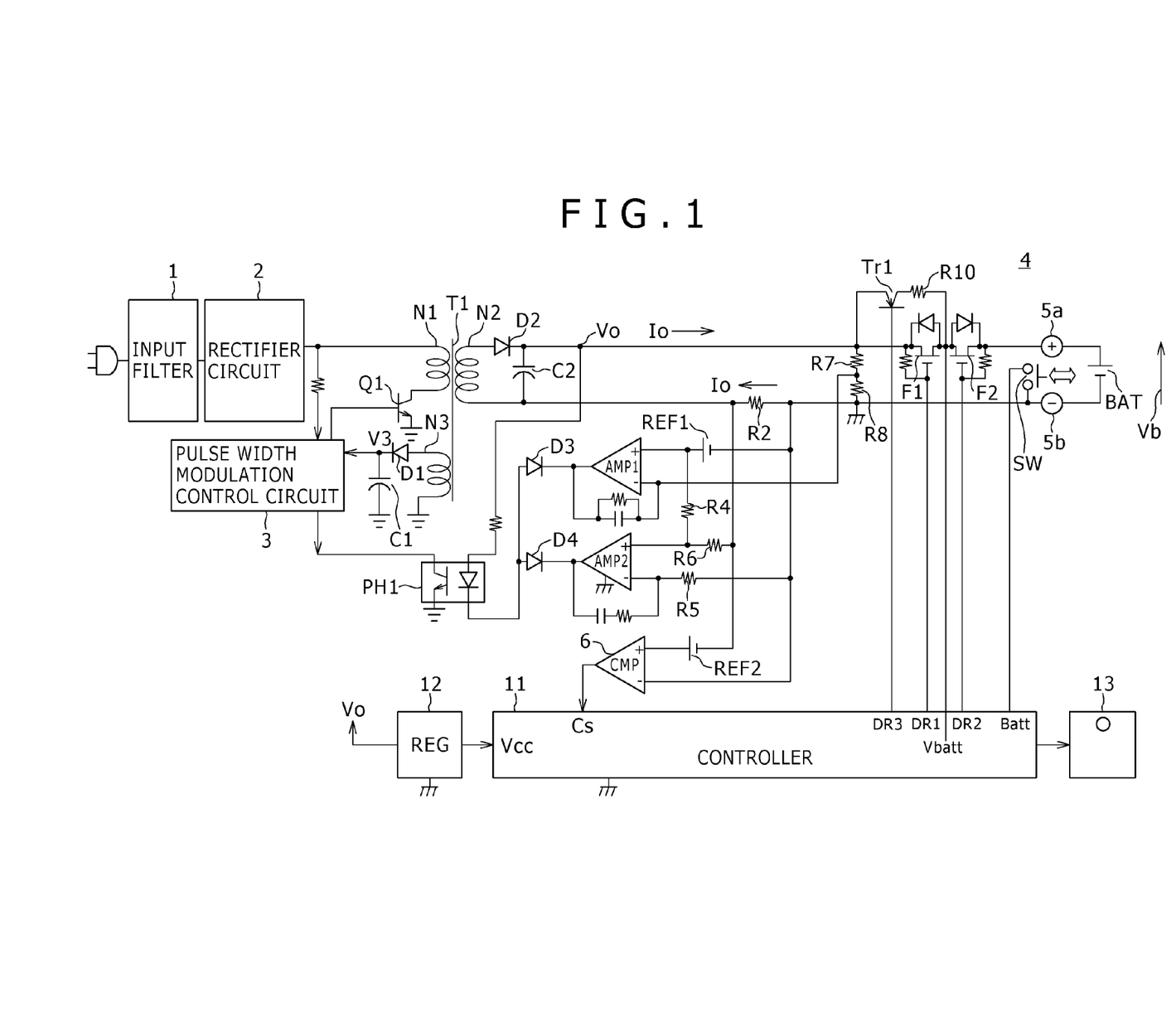
FIG. 1 is a connection diagram of an example of a known battery charger.

FIG. 1 shows a configuration similar to that shown in the above Patent Document 1. Commercial alternating current (referred to as "AC" for convenience' sake, hereinafter) power source is converted into a DC power source by an input filter 1 and a rectifier circuit 2. A switching power source includes a pulse width modulation control circuit 3, a transistor Q1, and a transformer T1. The transistor Q1 as a switching element performs switching operation, for example, at 100 kHz, by output pulses from the pulse width modulation control circuit 3. Rectified output of a diode D1 and a capacitor C1, connected to a tertiary winding N3 of the transformer T1, is supplied as a power source of the pulse width modulation control circuit 3.

The transistor Q1 regulates current flowing through a primary winding N1, and correspondent electric power is induced on a secondary winding N2 and the tertiary winding N3. A voltage induced on the secondary winding N2 is rectified by a diode D2 and a capacitor C2 to obtain a rectified output Vo. The rectified output Vo is extracted through a switching unit 4 composed of an FET F1, an FET F2, and a transistor Tr1 and the like, between output terminals 5a [positive(+)side] and 5b [negative(−)side].

A secondary battery BAT such as a lithium ion secondary battery, is connected between the output terminals 5a and 5b. The secondary battery BAT is connected in attachable/detachable manner to/from the battery charger. The battery charger includes a switch SW for detecting attachment/detachment of the secondary battery BAT. Upon attachment of the secondary battery BAT, the switch SW turns on, and a detection signal Batt at L (which means LOW level, the same applies hereinafter), indicating that the secondary battery BAT is attached, is supplied to a controller 11 composed of a microcomputer.

The rectified output Vo is divided by a resistor R7 and a resistor R8 to input to the negative(−)terminal of an operation amplifier AMP1. On the other hand, the positive(+)terminal of the operation amplifier AMP1 is supplied with a reference voltage REF1. The output voltage Vo is compared with the reference voltage REF1, and an error signal indicating difference from the reference voltage is supplied to a photocoupler PH1 through a diode D3.

The error signal transmitted from the secondary side to the primary side of the photocoupler PH1 is supplied to the pulse width modulation control circuit 3. The pulse width modulation control circuit 3 controls an ON period of output pulses from the transistor Q1, so as to control electric power to be supplied to the secondary side, whereby an output voltage set by the reference voltage on the secondary side is extracted.

An output (charge) current Io is detected by a resistor R2. The load-side (output-side) terminal of the resistor R2 is connected to the negative terminal of an operation amplifier AMP2 via a resistor R5. A voltage divided from the reference voltage REF1 by resistors R4 and R6 is supplied to the positive terminal of the operation amplifier AMP2, to thereby raise voltage level at the positive(+)terminal of the operation amplifier AMP2.

Flow of output current Io induces voltage drop over the resistor R2 ascribable to the output current Io. As a consequence, a voltage divided by the resistors R4 and R6 decreases. Increase in the output current Io causes further voltage drop at the positive terminal of the operation amplifier AMP2. When the potential at the positive(+)terminal of the operation amplifier AMP2 falls down to the potential at the negative terminal or therebelow, the output signal from the operation amplifier AMP2 shifts from H (which means HIGH level, the same applies hereinafter) to L.

The output signal from the operation amplifier AMP2 is supplied to the pulse width modulation control circuit 3 through a diode D4 and a photocoupler PH1, so that the power control is performed similarly to voltage control. More specifically, voltage drop occurs at the positive terminal of the operation amplifier AMP2 depending on the amount of current flowing through the resistor R2, the potential of the positive terminal is compared with that of the negative terminal, and the amount of output current is controlled to keep voltage generated at the resistor R2 constant. The output current is regulated at a constant level in this way.

A predetermined voltage stabilized from an output voltage $V_O$ by the regulator 12 is supplied to the controller 11 as a source voltage. An LED (light emitting diode) 13 as a display element, indicating the state of charging operation, is connected to the controller 11.

The switching unit 4 is operated by drive pulse signals DR1, DR2, and DR3 outputted from the controller 11. When the controller 11 detects the attachment of the secondary battery BAT by receiving the detection signal Batt, charging operation starts and a predetermined charging operation proceeds under monitoring of battery voltage Vbatt.

Figure 2:
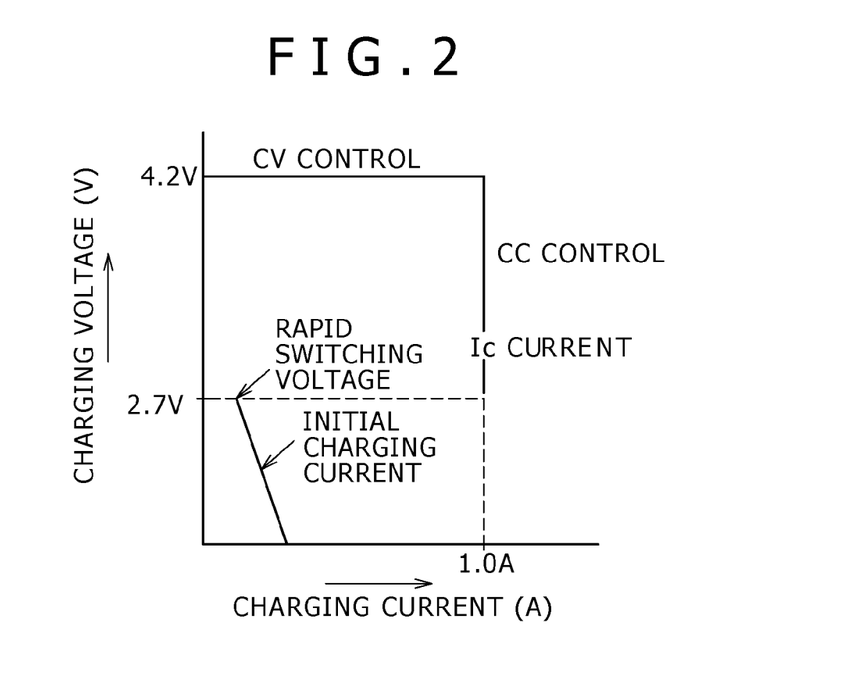
FIG. 2 is a chart showing the output characteristics of the known battery charger.

The above-described battery charger charges the secondary battery BAT based on a CC/CV (constant current-constant voltage) charging system, which is a combined system of constant-current charging and constant-voltage charging. FIG. 2 shows output characteristics of the above-described battery charger. The abscissa represents charging current, and the ordinate represents charging voltage. The battery charger first operates in the constant-current control mode, for example, at 1.0 A, and then operates in the constant-voltage control mode, for example, at 4.2 V. In the initial charging mode in the early stage of charging, the charging at initial charging current $I_f$ is proceeded. When the voltage reaches a rapid switching voltage, for example, at 2.7 V, the charging mode switches to a rapid charging mode.

Figure 3:
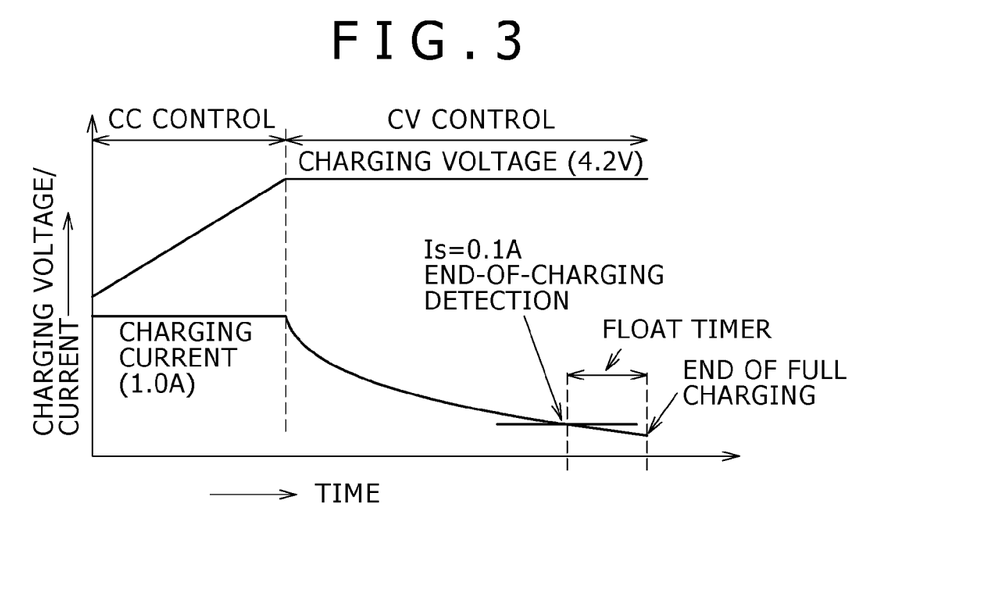
FIG. 3 is a chart showing voltage and current changes during the charge operation of the known battery charger.

FIG. 3 shows time-dependent changes(charging curve) in the charging voltage and charging current during charging. For example, the constant-current control proceeds in a region where the battery voltage is as high as the constant-voltage control voltage (4.2 V, for example) or below, whereby the constant-current charging proceeds under a constant current (1.0 A, for example). When the battery voltage (internal electromotive force) elevates to reach 4.2 V as a result of charging, the battery charger switches the operation into those under the constant-voltage control, whereby the charging current gradually decreases. When the charging current is detected to reach the end of charging detection value $I_s$, the end of charging is detected. From this point in time, a float timer activates, and the battery is charged until the timeout to terminate the charging of the battery. The charging adopts the floating timer, because the capacity may slightly be increased even after the point in time when the end of charging is detected.

In the configuration shown in FIG. 1, during the constant-current charging, the output of the operation amplifier AMP2 is supplied to the photocoupler PH1 through the diode D4, and the power source is regulated to give constant output current. In the constant-current charging, the output of the operation amplifier AMP2 is lower than that of the operation amplifier AMP1, and the power source is regulated by the output of the operation amplifier AMP2. During the constant-voltage charging, the output of the operation amplifier AMP1 is supplied to the photocoupler PH1 through the diode D3, and the power source is regulated by the output of the operation amplifier 1 so that the output voltage Vo can be brought to a predetermined voltage. In the constant-voltage charging, the output of the operation amplifier AMP1 is lower than that of the operation amplifier AMP2, and the power source is regulated by the output of the operation amplifier AMP1.

One end of the load side of the current detecting resistor R2 in the configuration of FIG. 1 is connected to the negative terminal of a comparator 6, and the other end thereof is connected to the negative side of a reference voltage REF2, and the positive side of the reference voltage REF2 is connected to the positive terminal of the comparator 6. The charging current is converted to a voltage by the resistor R2, and the voltage is compared with the reference voltage REF2. When the charging current is decreased, the reference voltage of the positive terminal of the comparator 6 is greater than the detecting voltage of the negative terminal thereof, and an output Cs of the comparator 6 is reversed. The output Cs of the comparator 6 is then supplied to the controller 11, and the controller 11 detects the end of charging.

SUMMARY

However, in the above battery charger thus configured to detect the end of charging, it is necessary to provide the reference voltage REF2 for detecting the end of charging in addition to the reference voltage REF1. It is also necessary to use, as the comparator 6 for detecting the end of charging, a high-accuracy offset comparator having a small offset voltage, which is an expensive component. Since the current value for detecting the end of charging is extremely small, it is necessary to increase the current detecting resistance value to some extent. In this case, however, loss in the detecting resistance will occur while performing the constant-current charging control.

The Patent Document 1 further describes as follows. That is, in the charge operation, the switching unit 4 (FET-F1 and FET-F2) is turned off in a predetermined cycle, and the charging is terminated upon detecting that a voltage difference $\Delta V$ (Vo–Vb (the open voltage of the secondary battery BAT)) between the input and the output of the switching unit 4 thus turned off is smaller than a predetermined voltage difference.

In this case, when the charging voltage with respect to the secondary battery BAT is set to 4.2 V, the power supply voltage with respect to the controller 11 is 2.5 V, which is smaller than the charging voltage. When a microcomputer with an A/D converter is employed as the controller 11, it is difficult to directly measure the $\Delta V$, thus requiring, for example, division of the $\Delta V$ by resistance. The resistance division may cause the problem that it is difficult to accurately measure the $\Delta V$ value due to variations in resistance value and variations in power supply voltage. To avoid this problem, it becomes necessary to use the regulator 12 for generating power supply voltage and high accuracy components as resistors, thereby increasing costs.

Accordingly, it is desirable to provide a battery charger capable of being manufactured at low costs, without requiring any expensive components used in the configuration for detecting the end of charging.

In accordance with an embodiment, a battery charger for charging a secondary battery using a power supply circuit which converts an AC input into a DC output, is provided which includes a discrimination circuit to discriminate a constant-current charging mode and a constant-voltage charging mode, and generate a discrimination signal, and a controller to which the discrimination signal is supplied. The constant-voltage charging mode charges the secondary battery at a constant voltage when a terminal voltage of the secondary battery of the constant voltage reaches a predetermined voltage. The constant-voltage charging mode is shifted to an end of charging mode when a charging current is lowered to an end of charging detection current. The controller generates, as a current of the constant current control, a control signal to switch between a current in the constant-current charging mode and the end of charging detection current. When judged as being the constant-current charging mode from the discrimination signal, the controller sets the current in the constant-current charging mode by using the control signal. When judged as being the constant-voltage charging mode from the discrimination signal, the controller sets intermittently the end of charging detection current by using the control signal, and sets an end of charging detection period for judging the constant-current charging mode and the constant-voltage charging mode in accordance with the discrimination signal. When the discrimination signal indicated the constant-voltage charging mode in the end of charging detection period, the controller controls to shift to the end of charging detection mode.

According to an embodiment, the output signal of the operation amplifier for controlling the constant-current charging and the output signal of the operation amplifier for controlling the constant-voltage charging are compared to detect the end of charging. Accordingly, any expensive comparator having a small offset is not needed to compare these two signals, thus achieving the low cost configuration.

Additional features and advantages are described herein, and will be apparent from the following Detailed Description and the figures.

DETAILED DESCRIPTION OF EMBODIMENTS

A first embodiment will be described below with reference to FIG. 4. The battery charger in FIG. 4 charges a secondary battery BAT in CC-CV (constant current-constant voltage) charging mode combined of constant-current charging and constant-voltage charging, having improvements in the known battery charger as shown in FIG. 1. An output voltage Vo rectified by a diode D2 and a capacitor C2 is applied to both ends of the secondary battery BAT through a switching unit 4.

Transistors Tr1, FET-F1, and FET-F2 included in the switching unit 4 are switched by drive signals DR1, DR2, and DR3 outputted from a controller 11, respectively. A detection signal Batt, which is generated by a switch SW and indicates whether the secondary battery BAT is mounted, is supplied to the controller 11. A battery voltage Vbatt is extracted from the connecting point of the FET-F1 and FET-F2 connected in series, and the battery voltage Vbatt is then supplied to the controller 11. An LED 13 for displaying the charging state is connected to the controller 11.

Resistors R7 and R8, an operation amplifier AMP1, and a reference voltage REF1 are used to detect variations in an output voltage Vo, and the output voltage Vo is controlled by a pulse width modulation control circuit 3 so as to become the desired voltage.

The load side (the output side) terminal of a resistor R2 is supplied to the negative terminal of an operation amplifier AMP2 via a resistor R5, and a voltage, which is obtained by dividing a reference voltage REF1 by resistors R4 and R6, is supplied to the positive terminal of the operation amplifier AMP2, thereby increasing the voltage of the positive terminal of the operation amplifier AMP2. In a first embodiment of the application, the connecting point of the resistors R4 and R6 (the positive terminal of the operation amplifier AMP2) is connected to the output terminal of a control signal Is/Ic of the controller 11 via a resistor R13. The control signal Is/Ic may be for both of the open state and the L state, as will be described later. The open state and the L state of the control signal Is/Ic are schematically shown by a switch element within the controller 11.

By flowing the output (charging) current Io, a voltage drop ascribable to the output current occurs at the resistor R2. As a result, the resistance-divided voltage by using the resistors R4 and R6 is lowered. Any further increase in the output current Io causes a further voltage drop at the positive terminal of the operation amplifier AMP2. When the voltage at the positive terminal of the operation amplifier AMP2 becomes equal to or below the voltage at the negative terminal thereof, the output signal of the operation amplifier AMP2 is changed from H to L.

The output signal of the operation amplifier AMP2 is supplied to the pulse width modulation control circuit 3 through a diode D4 and a photocoupler PH1. Similarly to the voltage control, the electric power control is performed by the pulse width modulation circuit 3 on the primary side. That is, due to the amount of current passing through the resistor R2, the positive terminal of the operation amplifier AMP2 is subjected to a voltage drop, and compared with the negative terminal thereof. The amount of output current is controlled so that the voltage generated at the resistor R2 is regulated to a constant value. Thus, the output current is regulated to a constant value.

Thus, in the constant-current charging mode performing constant-current charging, the output of the operation amplifier AMP2 is supplied to the photocoupler PH1 through the diode D4, and the power source is regulated so that the output current is brought to a constant current. In the constant-current charging mode, the output of the operation amplifier AMP2 is lower than that of the operation amplifier AMP1, and the power source is regulated by the output of the operation amplifier AMP2. In the constant-voltage charging mode performing constant-voltage charging, the output of the operation amplifier AMP1 is supplied through a diode D3 to the photocoupler PH1, and the power source is regulated so that the output voltage Vo is brought to a predetermined voltage by the output of the operation amplifier AMP1. In the constant-voltage charging mode, the output of the operation amplifier AMP1 is lower than that of the operation amplifier AMP2, so that the power source is regulated by the output of the operation amplifier AMP1.

In the first embodiment, the output of the operation amplifier AMP1 is supplied to the negative terminal of a comparator 16, and the output of the operation amplifier AMP2 is supplied to the positive terminal of the comparator 16. The output of the comparator 16 is supplied to the controller 11 as discrimination signal CC/CV indicating the constant-current charging mode and the constant-voltage charging mode. The discrimination signal CC/CV changes the positive terminal of the comparator 16 to "L", and the negative terminal thereof to H during the constant-current charging control. On the other hand, the positive terminal of the comparator 16 becomes "H", and the negative terminal thereof becomes "L" during the constant-voltage charging control.

Upon receipt of the discrimination signal CC/CV, the controller 11 recognizes, when CC/CV=H, the transition from the constant-current charging control to the constant-voltage charging control. The controller 11 enters the open state during the constant-current charging control period at, for example, the constant current of 1 ampere(A), and generates a control signal Is/Ic in a constant cycle, such as every three minutes, during the constant-voltage charging control period.

When the control signal Is/Ic becomes L, the positive terminal of the operation amplifier AMP2 is grounded via a resistor R13. As a result, a resistor 6 and the resistor 13 are connected in parallel, thereby further reducing the reference voltage supplied to the positive terminal of the operation amplifier AMP2. When the control signal Is/Ic is in the state L, the voltage of the positive terminal of the operation amplifier AMP2 is obtained from the following expression.

End of charging voltage Vs (a voltage drop at the resistor R2)=Is×R2 where Is denotes an end of charging current.

The reference voltage of the positive terminal of the operation amplifier AMP2 is set to a voltage value equal to the end of charging voltage Vs. In this case, the constant-current charging control is changed from the state in which the charging current is controlled to a current Ic such as 1 A, to the state in which the charging current is controlled to a end of charging current Is such as 0.1 A. Thus, in the first embodiment, the constant-current charging control states include the state in which the control signal Is/Ic is the open state and the charging current is controlled to the current Ic (Ic current control), and the state in which the control signal Is/Ic is L and the charging current is controlled to the current Is (Is current control).

Figure 5:
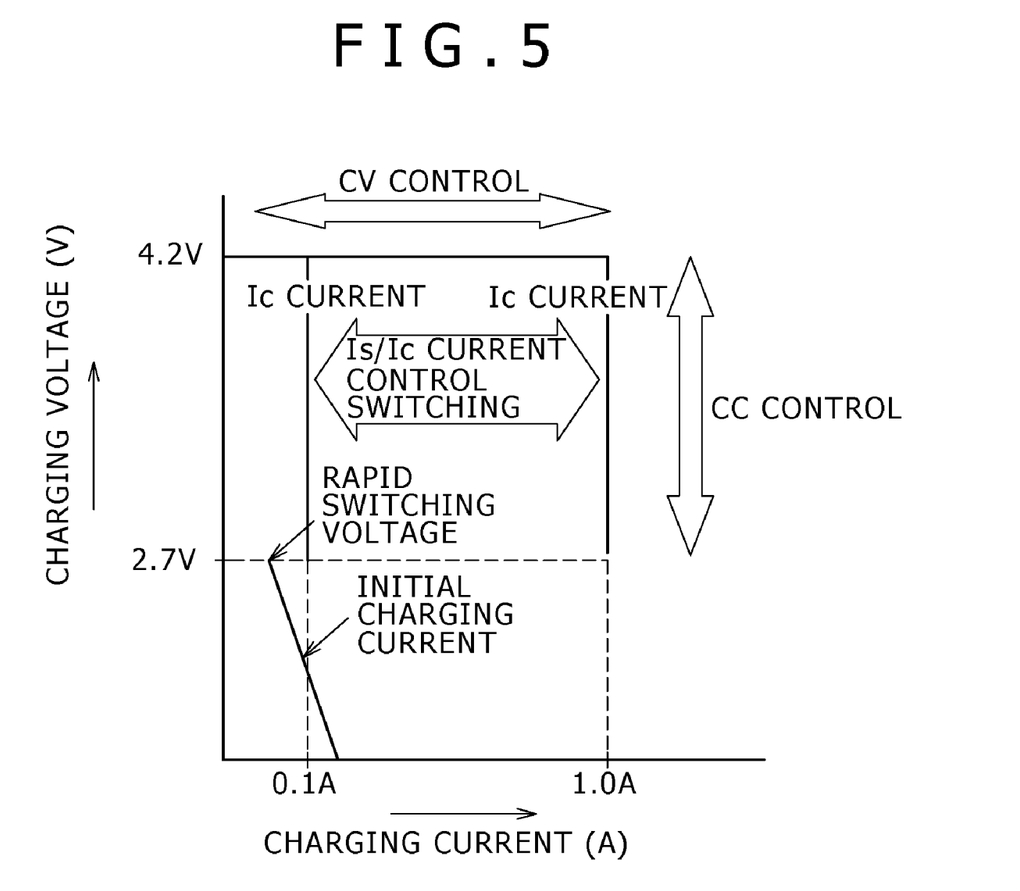
FIG. 5 is a schematic diagram for explaining the output characteristics of an embodiment.

FIG. 5 shows an example of the output characteristics of a first embodiment of the application. The battery charger firstly performs a rapid charge operation in the charge control of a constant current (CC) such as 1.0 A, and then performs the charge control operation in the constant voltage (CV) such as 4.2 V. In the initial charge mode at the start of charging, the charging is performed with an initial charging current $I_f$. The charging mode is switched to a rapid charge mode when the voltage reaches a rapid switching voltage such as 2.7 V. The constant current value is Ic (1.0 A) during the constant-current charging control period, and the constant current value is selected from Is (0.1 A) and Ic (1.0 A) during the constant-voltage charging control period.

Figure 6:
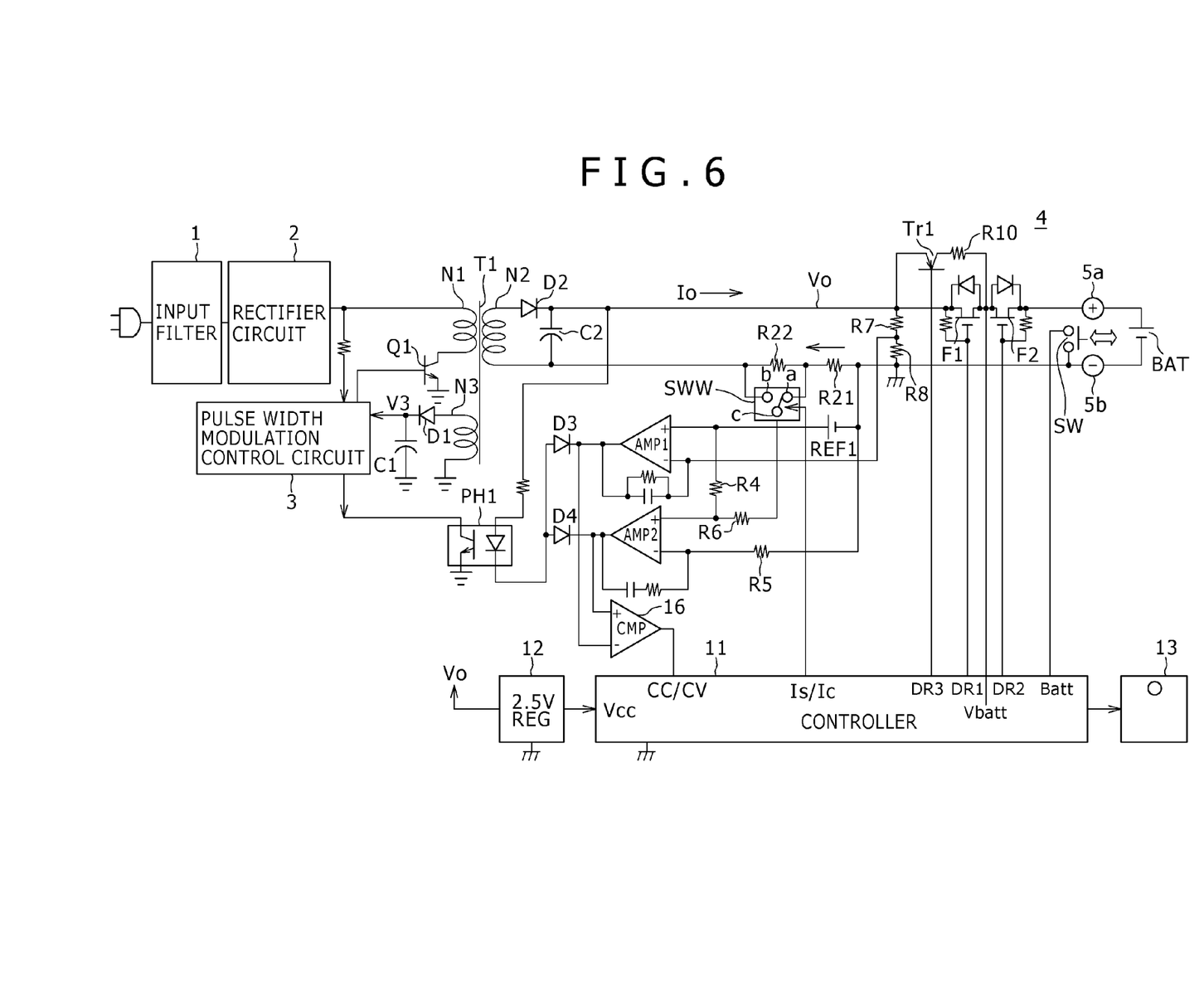
FIG. 6 is a connection diagram of a battery charger according to a second embodiment.

FIG. 6 shows a second embodiment, which is similar to the first embodiment in the point that the comparator 16 generates the discrimination signal CC/CV. In the second embodiment, an end of charging detecting resistance R22 is connected in series to a charging current detecting resistance R21. A switch SWW is provided in parallel to the resistor R22. One input terminal a of the switch SWW is connected to the connecting point of the resistors R21 and R22. The other input terminal b of the switch SWW is connected to the ground side terminal of the resistor R22 and a secondary wiring N2. An output terminal c of the switch SWW is connected to the positive terminal of the operation amplifier AMP2.

The switch SWW is switched by a control signal Is/Ic to be outputted from the controller 11. Similarly to the first embodiment, the control signal Is/Ic is generated based on the discrimination signal CC/CV, and it becomes the open state in the initial charging mode and during the constant-current charging control period at a constant current Ic of 1 ampere, and becomes the L state during the constant-current charging control period at a constant current Is of 0.1 A.

When the control signal Is/Ic is in the open state, the input terminal a and the output terminal c of the switch SWW are connected to each other. In this state, the charging current is detected by the current detecting resistor R21. When the control signal Is/Ic is in the L state, the input terminal b and the output terminal c of the switch SWW are connected to each other. In this state, the charging current is detected by a combined resistance of the detecting resistors R21 and R22 connected in series.

Here, a description will be made of the setting of the values of the resistors R21 and R22. It is assumed that the rapid charging current Ic is 1.0 A and the charge terminal current value Is is 0.1 A. For example, when R21 is 0.1Ω, a voltage drop (a detecting voltage V21=Ic×R21=1.0 A×0.1Ω=0.1 V) occurs at the resistor R21 during the rapid charging period. The above detecting voltage V21 is inputted to the positive terminal of the operation amplifier AMP2 through the input terminal a and the output terminal c of the switch SWW. By using a reference voltage REF1 and the resistors R4 and R6, setting is made so that the voltage V21 becomes 0.1 V. Accordingly, when the charging current is zero, the positive terminal of the operation amplifier AMP2 is set to 0.1 V.

On the other hand, the resistor R22 is set so that the voltage generated in the series connection of the resistors R21 and R22 at the charge terminal current Is of 0.1 A is equal to the voltage V21. By setting the resistor R22, the operation amplifier AMP2 is controlled to the end of charging current Is by using the same circuit configuration and the same reference voltage.

That is, $V21=0.1\ V=0.1\ A\times(R21+R22)=0.1\ A\times 1\Omega$

From R21=0.1Ω, it follows that R22=1Ω−R21=1Ω−0.1Ω=0.9Ω. Thus, R21 is set to 0.1Ω, and R22 is set to 0.9Ω.

In the second embodiment, the end of charging current Is is detected by the resistors R21 and R22 connected in series. This brings about the advantages that the detecting voltage can be increased than the case of detecting only by the resistor R21 even if the current Is is small.

Figure 7:
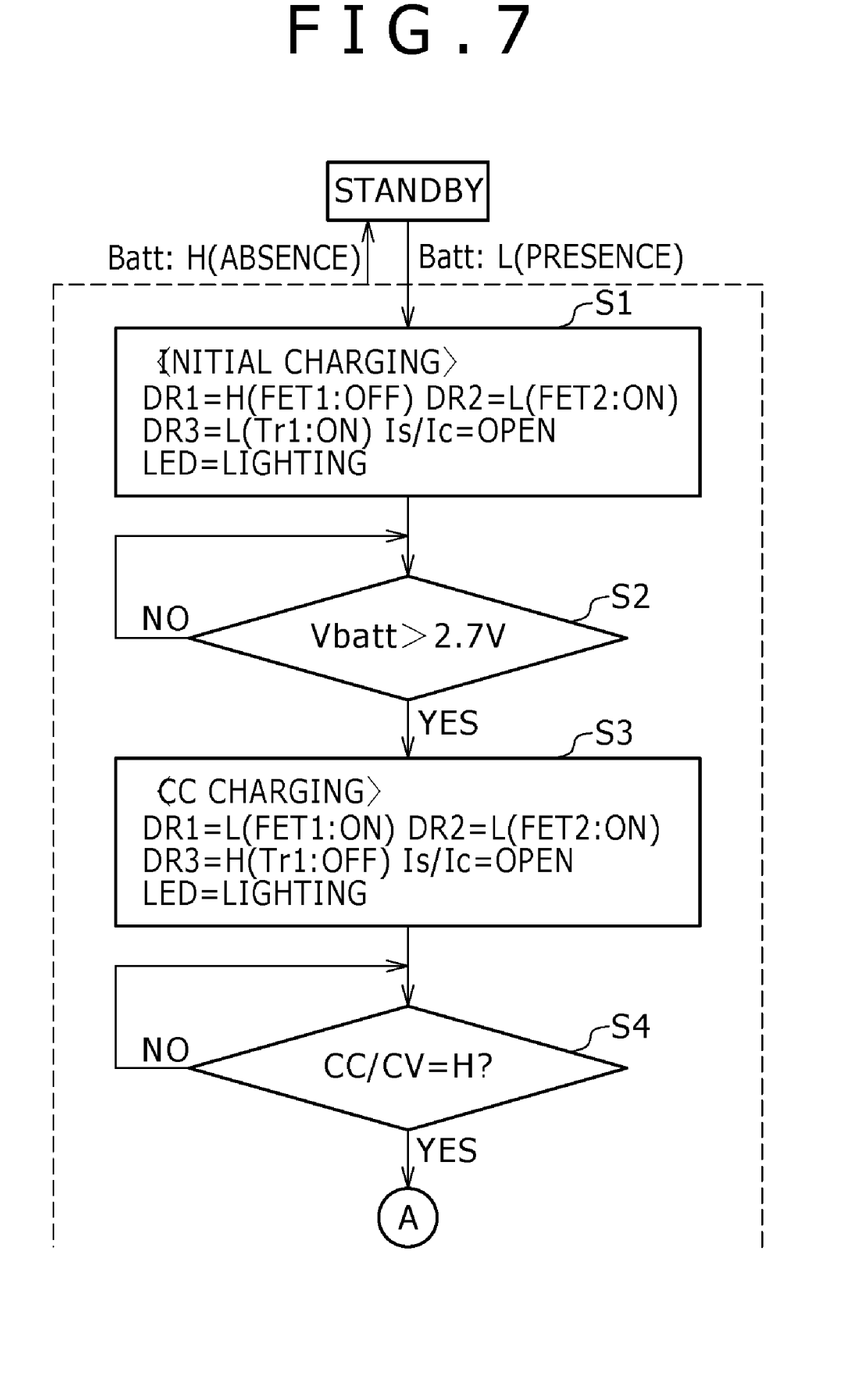
FIG. 7 is a part of the flow chart for explaining the flow of the operations in the first and second embodiments.
Figure 8:
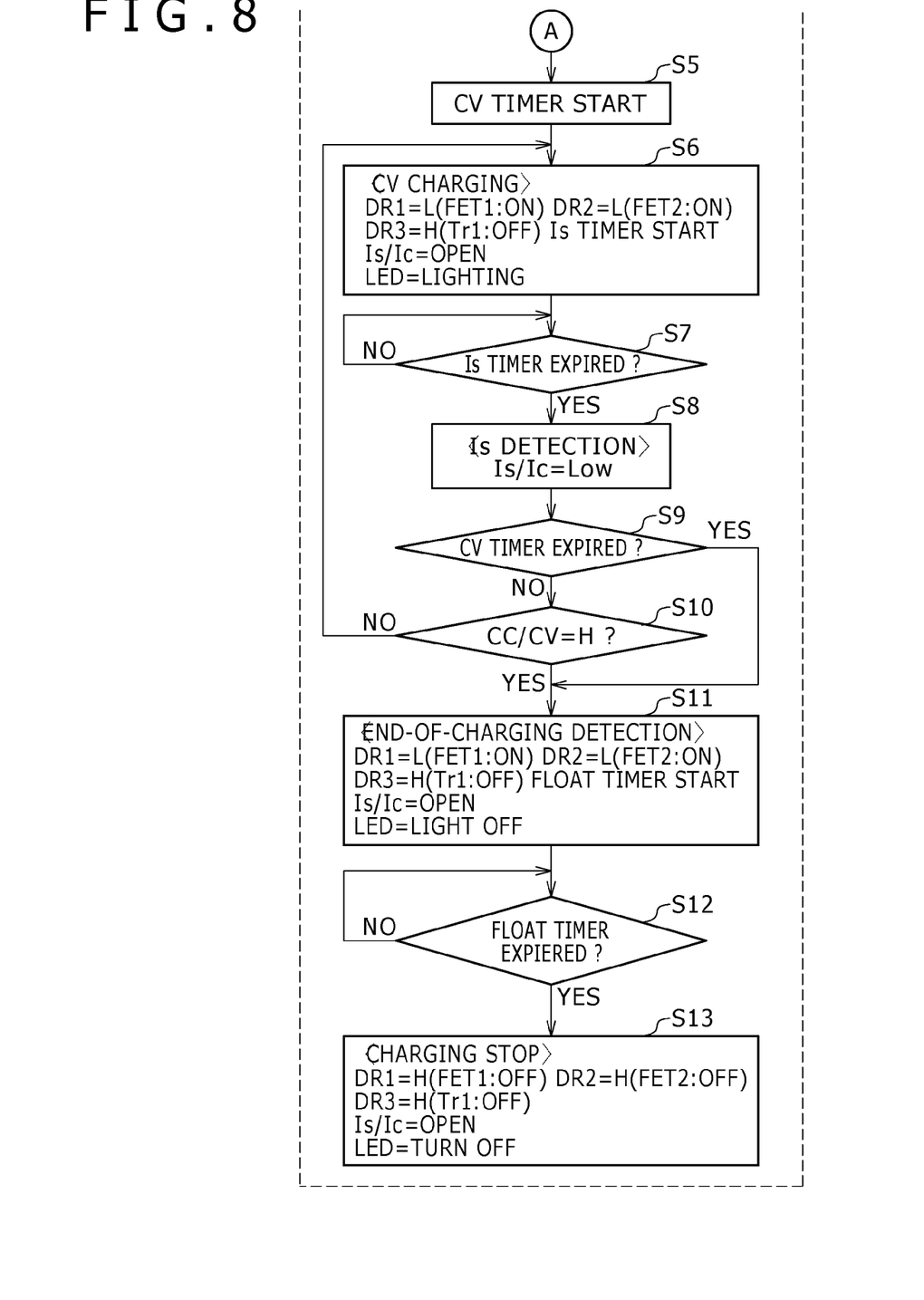
FIG. 8 is the rest of the above flow chart.

The charging control by the controller 11 will be described with reference to the flow chart of FIGS. 7 and 8. Although the flow chart is for explaining a series of processings, the flow chart is divided into two parts and drawn on two sheets due to space restrictions. When the mounting of the secondary battery BAT is detected by the switch SW, the detection signal Batt becomes L, and the charge operation starts.

In step S1, a drive signal DR1 is brought to H and an FET-F1 is turned off. A drive signal DR2 is brought to L, and an FET-F2 is turned on. A drive signal DR3 is brought to L, and a transistor Tr1 is turned on. Thus, the secondary battery BAT is initially charged through the transistor Tr1, the resistors R10, and the FET-F2. The control signal Is/Ic becomes the open state in the initial charging mode, and an LED 13 that remains unlit in the standby state lights up.

The initial charging current If is expressed by the following equation (1).

$$If=(Vo-Vtr)/R10 \quad (1)$$

where Vtr is an emitter-collector voltage of the transistor Tr1.

In step S2, it is judged whether the battery voltage Vbatt is greater than a predetermined voltage such as 2.7 V. If so, the procedure is shifted to the rapid charging mode (the constant-current charging mode) in step S3.

In the rapid charging mode (step S3), the drive signal DR1 is brought to L, and the FET-F1 is turned on. The drive signal DR2 is brought to L, and the FET-F2 is turned on. The drive signal DR3 is brought to H, and the transistor Tr1 is turned off. Thus, the secondary battery BAT is charged through the FET-F1 and the FET-F2. In the rapid charging mode, the control signal Is/Ic is in the open state, and the LED 13 remains lit continuously. The operation of the rapid charging mode is similar to that in the known battery charger shown in FIG. 1.

In step S4, it is judged whether a discrimination signal CC/CV generated in the output of the comparator 16 is H. When the discrimination signal CC/CV becomes H, in step S5 shown in FIG. 8, a charge timer (a CV timer) starts (activates) to cause the transition from the constant-current charging control to the constant-voltage charging control. The CV timer is for preventing the charge time from being too long.

In the constant-voltage charging mode in step S6, the drive signal DR1 is brought to L, and the FET-F1 is turned on. The drive signal DR2 is brought to L, and the FET-F2 is turned on. The drive signal DR3 is brought to H, and the transistor Tr1 is turned off. Thus, the secondary battery BAT is charged through the FET-F1 and the FET-F2. The control signal Is/Ic is in the open state, and the LED 13 remains lit continuously. An Is timer also starts to enter the waiting state until the end of charging detection period (an Is detection period) to be intermittently set.

In step S7, it is judged whether the Is timer is terminated. If so, in step S8, the procedure is shifted to an Is detection mode. In the Is detection mode, the control signal Is/Ic is L. Accordingly, in the configuration of FIG. 4, the positive terminal of the operation amplifier AMP2 is grounded. In the configuration of FIG. 6, the input terminal b and the output terminal c of the switch SWW are connected to each other. Upon the switching, the charging current is switched from the current Ic during the rapid charging period to the end of charging current Is.

In step S9, it is judged whether the CV timer is terminated. If so, in spite of the result of judgment in the following step S10, the procedure is shifted to an end of charging detection mode in step S11.

If the CV timer is not terminated, it is judged in step S10 whether the discrimination signal CC/CV is H. When the result of judgment is CC/CV=L (the constant-current charging control), the procedure returns to step S6, and the constant-voltage charging operation is performed. When the result of judgment is CC/CV=H (the constant-voltage charging control), the procedures is shifted to the end of charging detection mode in step S11.

In the end of charging detection mode, the drive signal DR1 is brought to L, and the FET-F1 is turned on. The drive signal DR2 is brought to L, and the FET-F2 is turned on. The drive signal DR3 is brought to H, and the transistor Tr1 is turned off. The timer of float charging (a float timer) starts. Accordingly, the secondary battery BAT is charged through the FET-F1 and the FET-F2. In the end of charging detection mode, the control signal Is/Ic is in the open state, and the LED 13 will become unlit. The user is informed of the end of charging by the unlit LED 13.

In step S12, it is judged whether the float timer is terminated (timeout). If so, the procedure proceeds to a charge stop mode in step S13. In the charge stop mode, the drive signal DR1 is brought to H, and the FET-F1 is turned off. The drive signal DR2 is brought to H, and the FET-F2 is turned off. The drive signal DR3 is brought to H, and the transistor Tr1 is turned off. Upon the turn-off of the switching unit 4, the charging current is shut off, and the charging to the secondary battery BAT is stopped. In the charge stop mode, the control signal Is/Ic is in the open state, and the LED 13 remains unlit.

Figure 9:
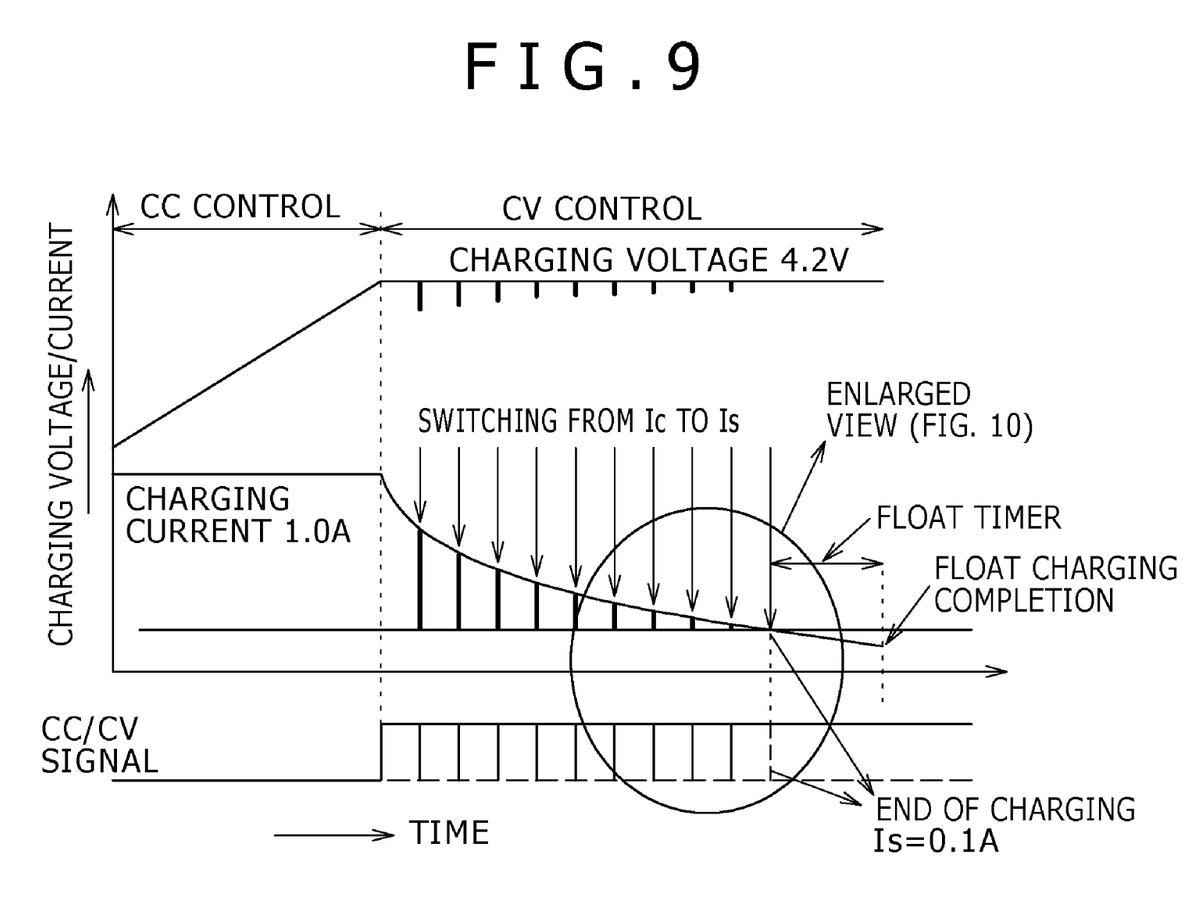
FIG. 9 is a schematic diagram showing voltage and current changes during the charge operation, for the purpose of describing the operation of the first embodiment.

The operation of embodiments of the present application will be described with reference of the charging curves in FIG. 9. As shown in FIG. 9, in the region where the charging voltage is not more than a constant-voltage charging control voltage (e.g. 4.2 V), the constant-current charging control is performed the constant-current charging at a constant charging current (e.g. 1.0 A). When the battery voltage (the internal electromotive force) increases and reaches 4.2 V by charging, the discrimination signal CC/CV becomes H, the battery charger is switched to the operation of the constant-voltage charging control, and the charging current will gradually decrease.

In the constant-voltage charging mode, the control signal Is/Ic is switched from the open state to the L state in a predetermined cycle (intermittently) by the controller 11, thereby switching from an Ic control mode to an Is control mode. When the charging current of not less than the end of charging detection current (0.1 A) flows in the Is control mode, the output of the operation amplifier AMP2 becomes lower than that of the operation amplifier AMP1, and the current control is performed so that the charging current is lowered to the current Is. Accordingly, the discrimination signal CC/CV to be outputted from the comparator 16 also becomes L. The controller 11 recognizes that the charging current is not the end of charging current because the result of judgment in step 10 is negative. Returning to step S6, the constant-voltage charging control continues for the time period defined by an Is timer, for example, three minutes.

Figure 10:
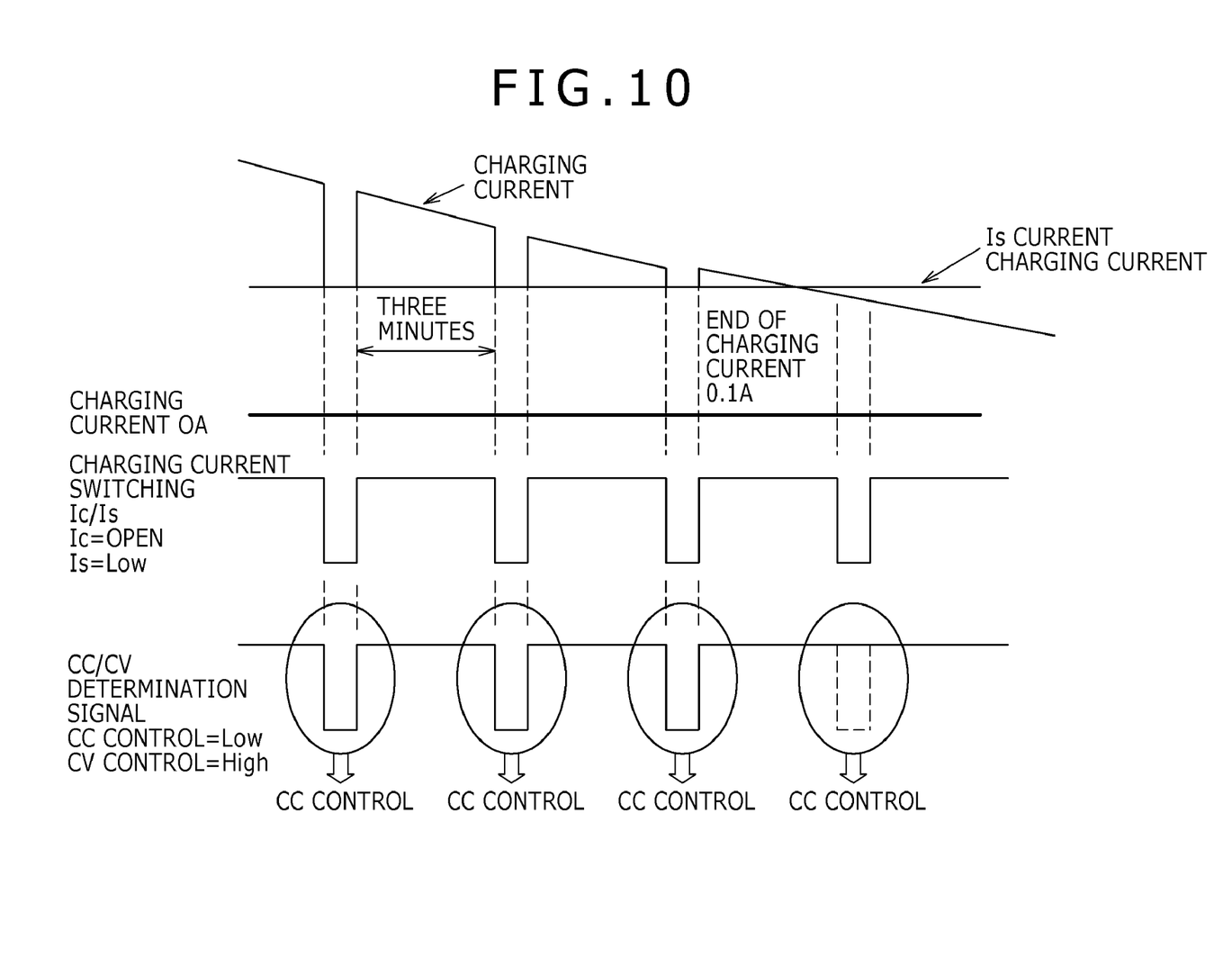
FIG. 10 is a schematic diagram showing in enlarged dimension a part of FIG. 9.

FIG. 10 shows in enlarged scale the range indicated by circle in FIG. 9. The Is control mode is carried out in three minutes cycles by the Is timer. The duration of the Is control mode is defined as a time period to ensure that a discrimination signal CC/CV is generated and the controller 11 judges the H/L of the discrimination signal CC/CV.

When the foregoing operation is repeated until the charging current is lowered to the end of charging current Is, the output of the operation amplifier AMP2 becomes higher than that of the operation amplifier AMP1, and the discrimination signal CC/CV to be outputted from the comparator 16 becomes H. Since the result of judgment in step S10 is positive, the controller 11 proceeds to the end of charging detection mode in step S11. Even if the end of charging state is thus detected, some charge amount may be accumulated depending on the battery. In this case, the float timer starts. The charging continues until the timeout thereof, and the charging to the battery is completely stopped.

Figure 11:
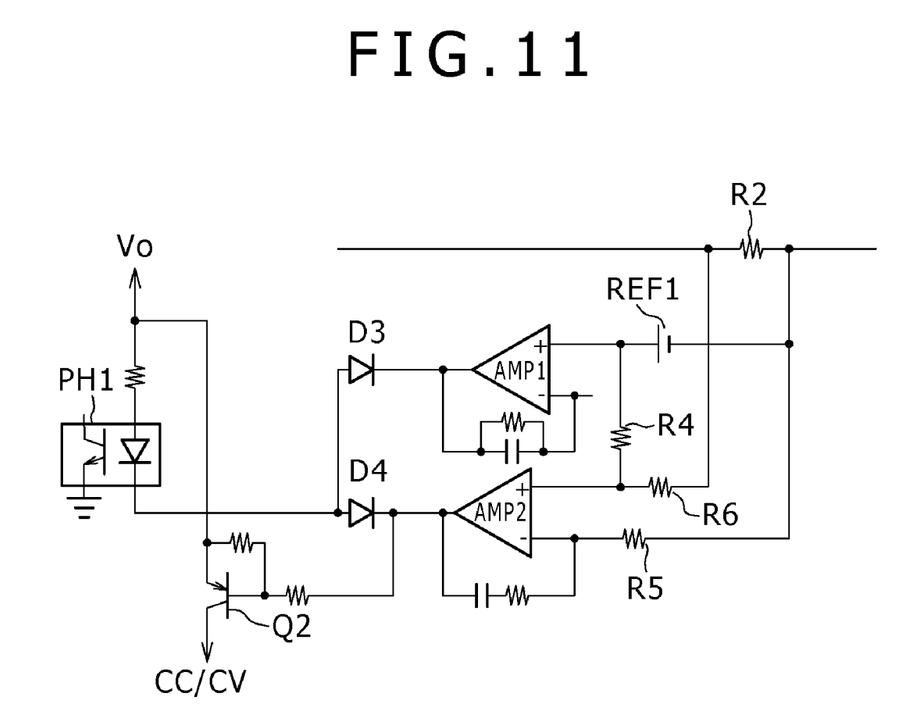
FIG. 11 is a connection diagram showing a modification of the configuration for generating a discrimination signal CC/CV in an embodiment.

FIG. 11 shows other example of the configuration for discriminating a discrimination signal CC/CV, in which only the related circuit sections are shown. As described above, in the constant-current charging control, the output of the operation amplifier AMP2 is L, and the output of the operation amplifier AMP1 is H. The emitter of a PNP type transistor Q2 is connected to the terminal from which an output voltage Vo is outputted, and the base thereof is connected to the output terminal of the operation amplifier AMP2. The discrimination signal CC/CV is extracted from the collector of the transistor Q2, and the discrimination signal CC/CV is then supplied to the controller 11.

In the constant-current charging control, when the output of the operation amplifier AMP2 becomes L, the transistor Q2 is turned on, and the discrimination signal CC/CV to be generated in the collector becomes H. In the constant-voltage charging control, the output of the operation amplifier AMP2 is H, and therefore, the transistor Q2 is turned off. Thus, instead of the comparator 16, the transistor Q2 can be used to generate the discrimination signal CC/CV, achieving a lower cost circuit configuration.

Figure 4:
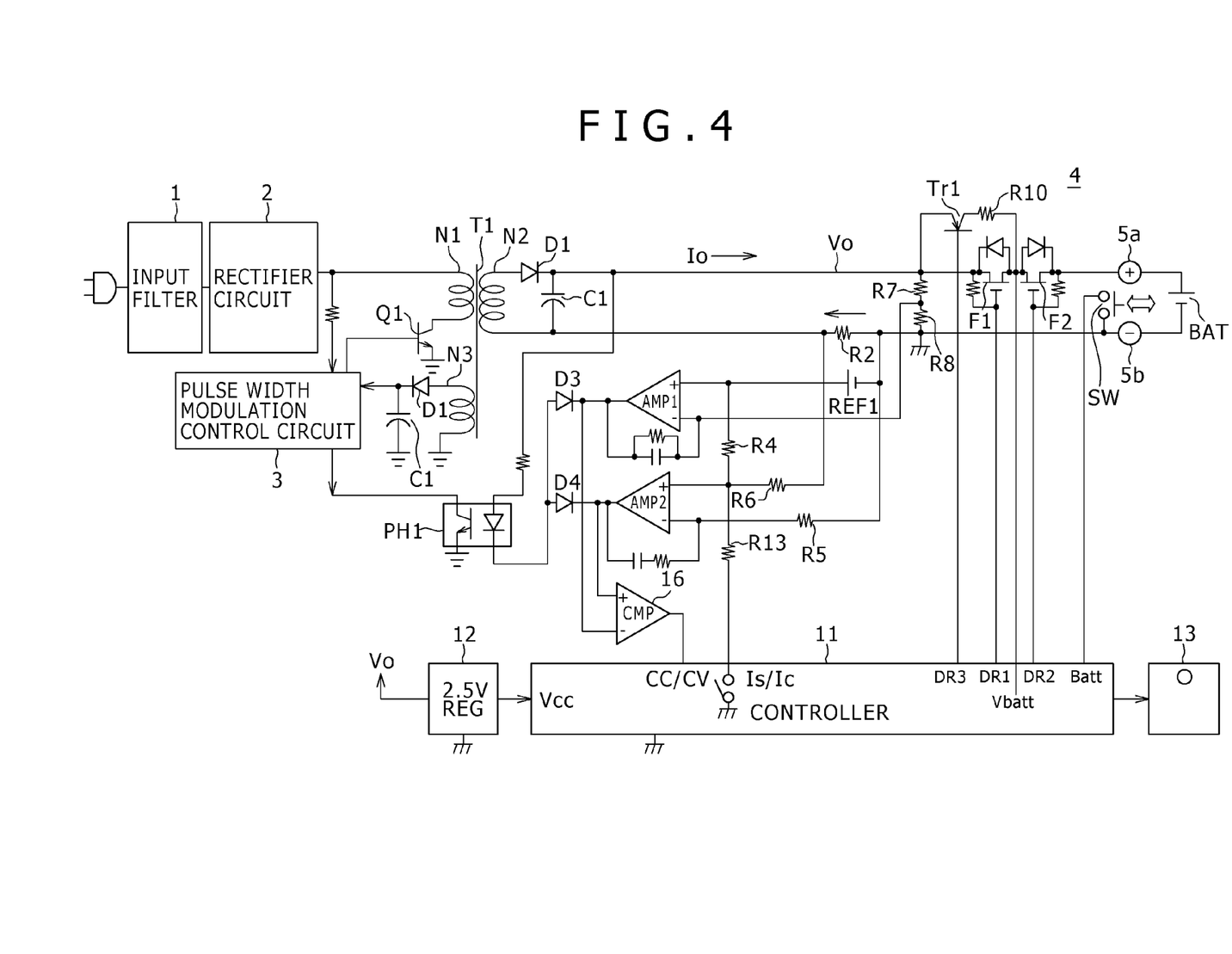
FIG. 4 is a connection diagram of a battery charger according to a first embodiment.

The first embodiment as shown in FIG. 4 provides the following advantages. That is, when the end of charging is detected by the fact that the charging current is lowered to the end of charging current, the end of charging current is small. Accordingly, the known battery charger requires the high accuracy comparator having a small offset voltage as a detection comparator. Whereas an embodiment uses the comparator that compares the output signal of the operation amplifier AMP2 for the constant-current charging control and the output signal of the operation amplifier AMP1 for the constant-voltage charging control. This permits the use of the comparator having the usual offset, achieving the low cost configuration. This also provides the advantages that no additional reference voltage source is required.

The second embodiment as shown in FIG. 6 provides the following advantages in addition to the above-mentioned advantages. That is, the resistor R22 is connected in series with respect to the current detection resistor R21 for the constant-current charging control. Using a voltage generated in the resistors (R21 and R22) on the series circuit, the switching is carried out to detect the end of charging. There is no need to change the internal reference voltage value, enabling the use of a general reference voltage source.

Additionally, both of the first and second embodiments eliminate the necessity for switching a charge protection timer (a constant-voltage charging control timer) depending on the battery capacity. When the charge protection timer starts from a charge starting point, the timer duration in accordance with the battery capacity may be required. Whereas according to an embodiment, the charge protection timer starts from the point that the constant-current charging control is switched to the constant-voltage charging control.

Accordingly, it becomes unnecessary to change the time measured by the timer, depending on the capacity.

Although there have been shown herein and described embodiments, it will be understood that many changes and modifications may be made therein according to an embodiment. For example, a plurality of secondary batteries may be charged. Any configuration other than those described in the first and second embodiments may be used as a power supply circuit for outputting a charging voltage and a charging current.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery charger for charging a secondary battery using a power supply circuit which converts an AC input into a DC output, the battery charger comprising:
a discrimination circuit to discriminate a constant-current charging mode and a constant-voltage charging mode, and generate a discrimination signal, the constant-current charging mode charging the secondary battery at a constant current, the constant-voltage charging mode charging the secondary battery at a constant voltage when a terminal voltage of the secondary battery of the constant voltage reaches a predetermined voltage, and the constant-voltage charging mode being shifted to an end of charging mode when a charging current is lowered to an end of charging detection current; and
a controller to which the discrimination signal is supplied, the controller generating, as a current of a constant current control, a control signal to switch between a current in the constant-current charging mode and the end of charging detection current,
wherein:
when judged as being the constant-current charging mode
from the discrimination signal, the controller sets the current in the constant-current charging mode by using the control signal,
when judged as being the constant-voltage charging mode from the discrimination signal, the controller sets intermittently the end of charging detection current by using the control signal, and sets an end of charging detection period for judging the constant-current charging mode and the constant-voltage charging mode in accordance with the discrimination signal, and
when the discrimination signal indicates the constant-voltage charging mode in the end of charging detection period, the controller controls to shift to the end of charging detection mode, the battery charger further comprising first and second resistors inserted in series into a charging current path, wherein:
the controller performs the constant current control by using a first detection voltage generated at the first resistor when setting a current in the constant-current charging mode, and
in the end of charging detection period, the controller switches to perform the constant current control by using a second detection voltage generated at a combined resistance of the first and second resistors connected in series.

2. The battery charger according to claim 1, wherein the controller controls to start a charge timer when the battery charger is shifted to the constant-voltage charging mode, and to shift to the end of charging detection mode when the charge timer reaches timeout.

3. A battery charger for charging a secondary battery using a power supply circuit which converts an AC input into a DC output, the battery charger comprising:
a discrimination circuit to discriminate a constant-current charging mode and a constant-voltage charging mode, and generate a discrimination signal, the constant-current charging mode charging the secondary battery at a constant current, the constant-voltage charging mode charging the secondary battery at a constant voltage when a terminal voltage of the secondary battery of the constant voltage reaches a predetermined voltage, and the constant-voltage charging mode being shifted to an end of charging mode when a charging current is lowered to an end of charging detection current; and
a controller to which the discrimination signal is supplied, the controller generating, as a current of a constant current control, a control signal to switch between a current in the constant-current charging mode and the end of charging detection current,
wherein:
when judged as being the constant-current charging mode
from the discrimination signal, the controller sets the current in the constant-current charging mode by using the control signal,
when judged as being the constant-voltage charging mode from the discrimination signal, the controller sets intermittently the end of charging detection current by using the control signal, and sets an end of charging detection period for judging the constant-current charging mode and the constant-voltage charging mode in accordance with the discrimination signal, and
when the discrimination signal indicates the constant-voltage charging mode in the end of charging detection period, the controller controls to shift to the end of charging detection mode, wherein the controller controls to shift to the end of charging detection mode when the discrimination signal becomes to indicate the constant-voltage charging mode in the end of charging detection period, and to start a float charge timer to continue charging in the end of charging detection mode, and to stop charging completely when the float charge timer reaches timeout.

4. A battery charger for charging a secondary battery using a power supply circuit which converts an AC input into a DC output, the battery charger comprising:
a discrimination circuit to discriminate a constant-current charging mode and a constant-voltage charging mode, and generate a discrimination signal, the constant-current charging mode charging the secondary battery at a constant current, the constant-voltage charging mode charging the secondary battery at a constant voltage when a terminal voltage of the secondary battery of the constant voltage reaches a predetermined voltage, and the constant-voltage charging mode being shifted to an end of charging mode when a charging current is lowered to an end of charging detection current; and
a controller to which the discrimination signal is supplied, the controller generating, as a current of a constant current control, a control signal to switch between a current in the constant-current charging mode and the end of charging detection current, wherein:

when judged as being the constant-current charging mode from the discrimination signal, the controller sets the current in the constant-current charging mode by using the control signal, when judged as being the constant-voltage charging mode from the discrimination signal, the controller sets intermittently the end of charging detection current by using the control signal, and sets an end of charging detection period for judging the constant-current charging mode and the constant-voltage charging mode in accordance with the discrimination signal, and when the discrimination signal indicates the constant-voltage charging mode in the end of charging detection period, the controller controls to shift to the end of charging detection mode, the battery charger further comprising:

a first comparator to generate a low level output when performing the output voltage control of the power supply circuit; and a second comparator to generate a low level output when performing the output current control of the power supply circuit, wherein output signals of the first and second comparators are supplied to an input of a third comparator, and the discrimination signal is obtained from the third comparator.

* * * * *